(12) United States Patent
Cho

(10) Patent No.: US 7,167,826 B2
(45) Date of Patent: Jan. 23, 2007

(54) COMMUNICATION TERMINAL CONTROLLED THROUGH TOUCH SCREEN OR VOICE RECOGNITION AND INSTRUCTION EXECUTING METHOD THEREOF

(75) Inventor: Su-kyung Cho, Seoul (KR)

(73) Assignee: Samsung Electronics Co. Ltd., Kyungki-do (KR)

(*) Notice: Subject to any disclaimer, the term of this patent is extended or adjusted under 35 U.S.C. 154(b) by 802 days.

(21) Appl. No.: 10/152,332

(22) Filed: May 22, 2002

(65) Prior Publication Data

US 2003/0009330 A1 Jan. 9, 2003

(30) Foreign Application Priority Data

Jul. 7, 2001 (KR) .............................. 2001-40682

(51) Int. Cl.
*G10L 19/00* (2006.01)
(52) U.S. Cl. ..................... 704/201; 704/500
(58) Field of Classification Search ........ 704/270–276, 704/235, 251, 231; 379/88.03, 199, 88.01, 379/354, 216.01; 434/169; 382/179, 229; 396/56; 701/200, 202, 208, 209; 710/5
See application file for complete search history.

(56) References Cited

U.S. PATENT DOCUMENTS

| 4,785,408 A | * | 11/1988 | Britton et al. | ............... 704/270 |
| 5,485,505 A | * | 1/1996 | Norman et al. | ............. 455/419 |
| 5,634,080 A | * | 5/1997 | Kikinis et al. | ................ 710/73 |
| 5,717,828 A | * | 2/1998 | Rothenberg | .................. 704/251 |
| 5,991,726 A | * | 11/1999 | Immarco et al. | ............ 704/270 |
| 6,429,846 B1 | * | 8/2002 | Rosenberg et al. | ......... 345/156 |
| 6,791,529 B1 | * | 9/2004 | Shteyn | ....................... 345/156 |
| 6,822,635 B1 | * | 11/2004 | Shahoian et al. | ........... 345/156 |

FOREIGN PATENT DOCUMENTS

| JP | 2000-56792 A | 2/2000 |
| JP | 2000-231398 A | 8/2000 |
| KR | 2000-0049864 A | 8/2000 |

OTHER PUBLICATIONS

Design of multimedia-train station inquire system, dated Sep. 2000.
Chen Fang, et al., "The Research and Realization of Intelligent Information Inquiring System", Journal of Northern Jiaotong University, Oct. 1997, vol. 21., No. 5, dated Oct. 1997.

* cited by examiner

*Primary Examiner*—Vijay B. Chawan
(74) *Attorney, Agent, or Firm*—Sughrue Mion, PLLC

(57) ABSTRACT

An information terminal having a touch screen on which an instruction is input by touching the screen and the result of executing the instruction is displayed includes: a voice recognition and learning unit for recognizing an input voice signal; and a system controller which when a predetermined item on the touch screen is touched, recognizes an instruction corresponding to the coordinates of the touched item, and which when a voice corresponding to a sub-instruction associated with the recognized instruction is recognized by the voice recognition and learning unit, executes the corresponding sub-instruction. If a currently input voice does not correspond to an instruction to be executed, the information terminal stores the fact that the currently input voice is a voice instruction for the instruction to be executed.

18 Claims, 3 Drawing Sheets

COMMUNICATION TERMINAL CONTROLLED THROUGH TOUCH SCREEN OR VOICE RECOGNITION AND INSTRUCTION EXECUTING METHOD THEREOF

BACKGROUND OF THE INVENTION

1. Field of the Invention

The present invention relates to an information terminal, and more particularly, to an information terminal controlled through a touch screen or voice recognition and an instruction executing method thereof. The present application is based on Korean Application No. 2001-40682, filed Jul. 7, 2001, which is incorporated herein by reference.

2. Description of the Related Art

Typically, portable information terminals using IMT2000 (International Mobile Telecommunications—Year 2000) technology are equipped with a touch screen to recognize the coordinates of the screen touched by a user and execute an instruction corresponding to the recognized coordinates.

FIG. 1 is a flowchart of a method for recognizing an instruction through a touch screen according to a conventional art. Referring to FIG. 1, items that the user can select are displayed on a touch screen of a portable information terminal. When the user selects one of the items displayed on the screen and touches the same (step 10), the portable information terminal recognizes coordinates x and y corresponding to the touched point of the screen and searches for an instruction corresponding to the recognized coordinates x and y (step 12).

If one instruction is found, the found instruction is executed (step 16). If two or more instructions are found, the found instructions are displayed again on the touch screen (step 18) and then the steps 10–14 are repeatedly performed. That is, if the item selected by the user has a plurality of sub-instructions associated therewith, the portable information terminal displays the sub-instructions on the touch screen, which enables the user to select one of the sub-instructions. Because of limitations of the screen, instructions must be executed one by one. Furthermore, the instructions must be selected many times in order to perform a specific task desired by the user.

Meanwhile, in a case where the portable information terminal recognizes a voice to perform a specific instruction, for example, if a spoken message "Please speak an instruction" is firstly submitted by the portable information terminal, the instruction must be spoken within a given time. If the given time has lapsed, the portable information terminal cannot recognize a spoken instruction and outputs another spoken message, such as, "Please speak an instruction again." If the portable information terminal cannot recognize the user's voice, the terminal outputs spoken words, such as, "Try again in a quieter place" or "This is an instruction that cannot be executed" and terminates the instruction execution mode. Thus, portable information terminals are unsatisfactory, since they terminate an instruction execution mode unless a specific voice is recognized within a given time.

SUMMARY OF THE INVENTION

To solve the above problems, it is a first object of the present invention to provide an information terminal that can be controlled by a user more effectively and conveniently through a combination of a touch screen and a voice recognition technology.

It is a second object of the present invention to provide an instruction executing method performed by the information terminal.

It is a third object of the present invention to provide a recording medium on which the instruction executing method is stored.

In order to achieve the first object, the present invention provides an information terminal having a touch screen on which an instruction is input by touching the screen and the result of executing the instruction is displayed.

The information terminal preferably, includes a voice recognition and learning unit for recognizing a voice signal input from the outside; and a system controller which when a predetermined item on the touch screen is touched, recognizes an instruction corresponding to the coordinates of the touched item, and which when a voice corresponding to one of a plurality of sub-instructions associated with the recognized instruction is recognized by the voice recognition and learning unit, executes the corresponding sub-instruction.

In order to achieve the second object, the present invention provides an instruction executing method performed by an information terminal in which an instruction is executed by recognizing coordinates of a selected item or a voice of a user when one of a plurality of items displayed on a touch screen is selected. The method includes: (a) recognizing a voice of the user input when one of the items is selected on the touch screen; (b) upon recognizing a voice corresponding to one of a plurality of sub-instructions corresponding to coordinates of the item selected in step (a), executing a corresponding sub-instruction; and (c) upon recognizing no voice corresponding to any one of the sub-instructions, displaying the sub-instructions on the touch screen.

In another embodiment, an instruction executing method performed by an information terminal in which an instruction is executed by recognizing the coordinates of a selected item or a voice of a user when one of a plurality of items displayed on a touch screen is selected preferably includes: (a) recognizing an instruction corresponding to the coordinates of a selected item when one of items is selected on the touch screen; (b) executing the recognized instruction if the recognized instruction is not determined to have any sub-instruction associated therewith; (c) waiting for the input of a user's voice if the recognized instruction is determined to have two or more sub-instructions; (d) upon receiving a user's voice, recognizing the user's voice and thus a sub-instruction corresponding to the recognized voice and returning to step (b); (e) upon not recognizing a voice corresponding to any one of the sub-instructions in step (d), displaying the sub-instructions on the touch screen; and (f) upon selecting one of the sub-instructions on the touch screen, recognizing the selected sub-instruction through coordinates thereof and returning to step (b) and learning a voice for the selected sub-instruction.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
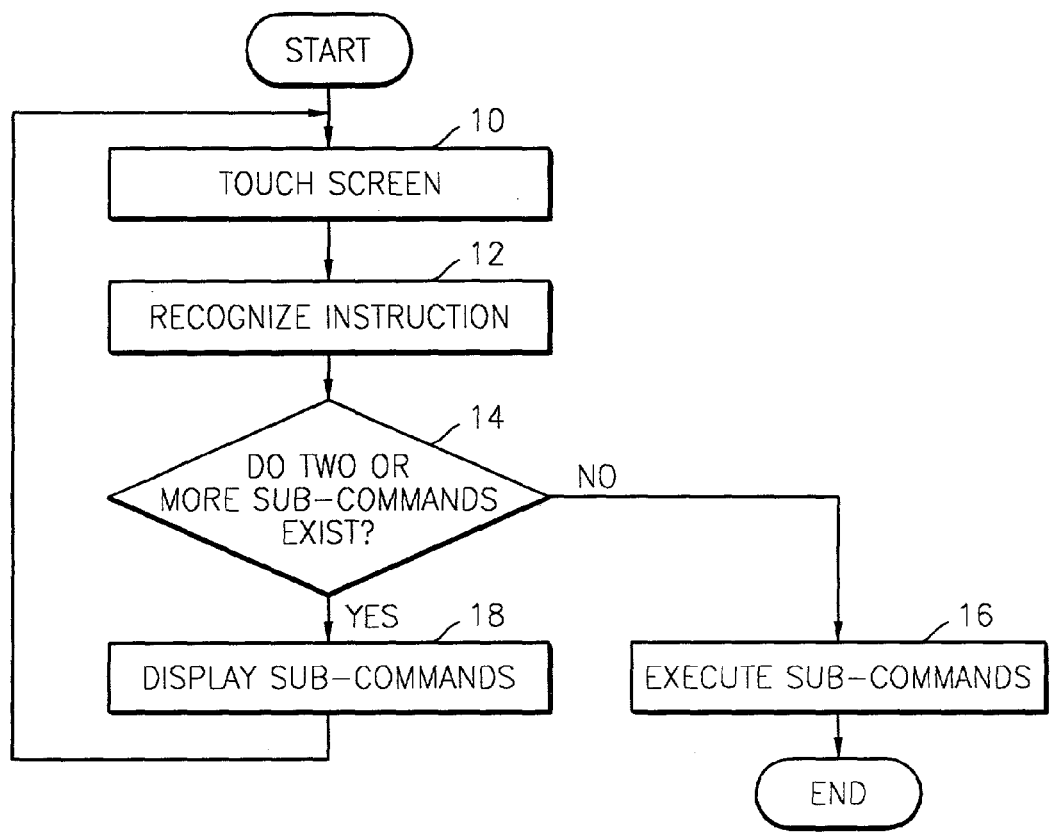
FIG. 1 is a flowchart of a method for recognizing an instruction through a touch screen according to a conventional art.
Figure 2:
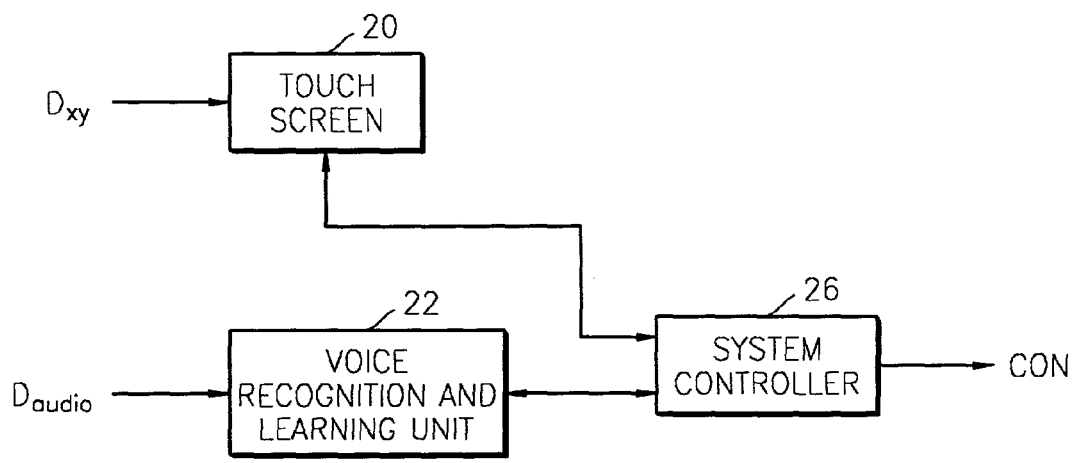
FIG. 2 is a schematic block diagram of an information terminal controlled through touch screen and voice recognition according to an embodiment of the present invention.

Referring to FIG. 2, an information terminal controlled through a touch screen and voice recognition according to an embodiment of the present invention includes a touch screen 20, a voice recognition and learning unit 22, and a system controller 26. The result of executing an instruction corresponding to an item touched and selected by a user is displayed on the touch screen 20. The voice recognition and learning unit 22 recognizes a voice signal received from the outside and provides the result of recognition to the system controller 26. Also, the voice recognition and learning unit 22 learns the voice signal under the control of the system controller 26.

If a voice signal is input to the voice recognition and learning unit 22 by touching a predetermined item on the touch screen 20, the system controller 26 recognizes an instruction corresponding to the coordinates of the touched item. Also, if a voice corresponding to one of a plurality of sub-instructions associated with the recognized instruction is recognized by the voice recognition and learning unit 22, the system controller 26 executes the corresponding sub-instruction.

On the other hand, if a voice corresponding to one of the plurality of sub-instructions is not recognized by the voice recognition and learning unit 22, the system controller 26 displays the plurality of sub-instructions on the touch screen 20. Then, if one of the plurality of sub-instructions is selected by the user, the system controller 26 controls the voice recognition and learning unit 22 so that the voice recognition and learning unit 22 learns that a sub-instruction corresponding to the input voice signal is the sub-instruction selected by the user.

Figure 3:
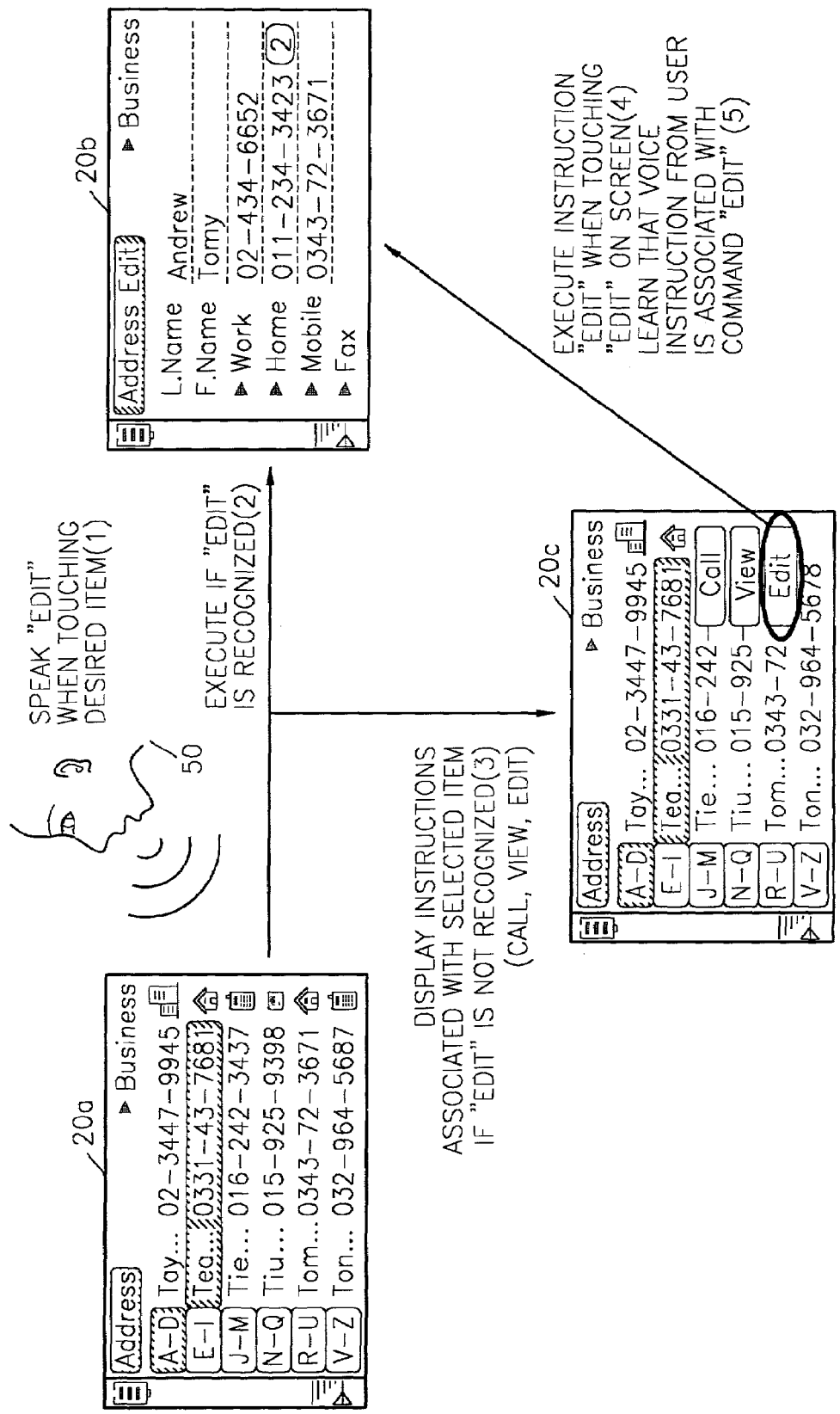
FIG. 3 shows an instruction executing process performed by the information terminal of FIG. 2 according to an embodiment of the present invention.

FIG. 3 shows an instruction executing method performed by the information terminal of FIG. 2. For convenience of explanation, editing information by the user will now be described.

Referring to FIGS. 2 and 3, if a user 50 desires to edit personal information about someone stored in the information terminal, as shown in FIG. 3, a screen 20a on which personal information is stored is displayed. The user 50 speaks the word "edit" when touching one item of the personal information with a stylus pen (step 1). If the voice recognition and learning unit 22 recognizes the spoken word "edit", the system controller 26 executes an instruction "edit" to display an edit screen 20b on which information about the selected item can be edited (step 2). The system controller 26 permits the instruction "edit" to flicker while executing the instruction "edit", thus informing the user that the instruction "edit" is being executed.

Conversely, if the voice recognition and learning unit 22 doesn't recognize the spoken word "edit", for example, if the user speaks "pyonzeep" which means "edit" in Korean, the system controller 26 displays sub-instructions that can be executed in a current situation status on a touch screen 20c. As shown in FIG. 3, if sub-instructions "call", "view", and "edit" are displayed, the user 50 selects a sub-command "edit" among them. If the sub-command "edit" is selected on the touch screen 20c, the system controller 26 executes an instruction "edit" to display the edit screen 20b on which information about the selected item can be edited (step 4). At the same time, the system controller 26 controls the voice recognition and learning unit 22 so that the voice recognition and learning unit 22 learns that the voice input by the user 50 is a voice for the sub-command "edit"(step 5). By virtue of voice learning of the voice recognition and learning unit 22, the user 50 can execute an instruction "edit" regardless of which one of "edit" and "pyonzeep" is spoken. Consequently, the user 50 is free to change a voice instruction.

Figure 4:
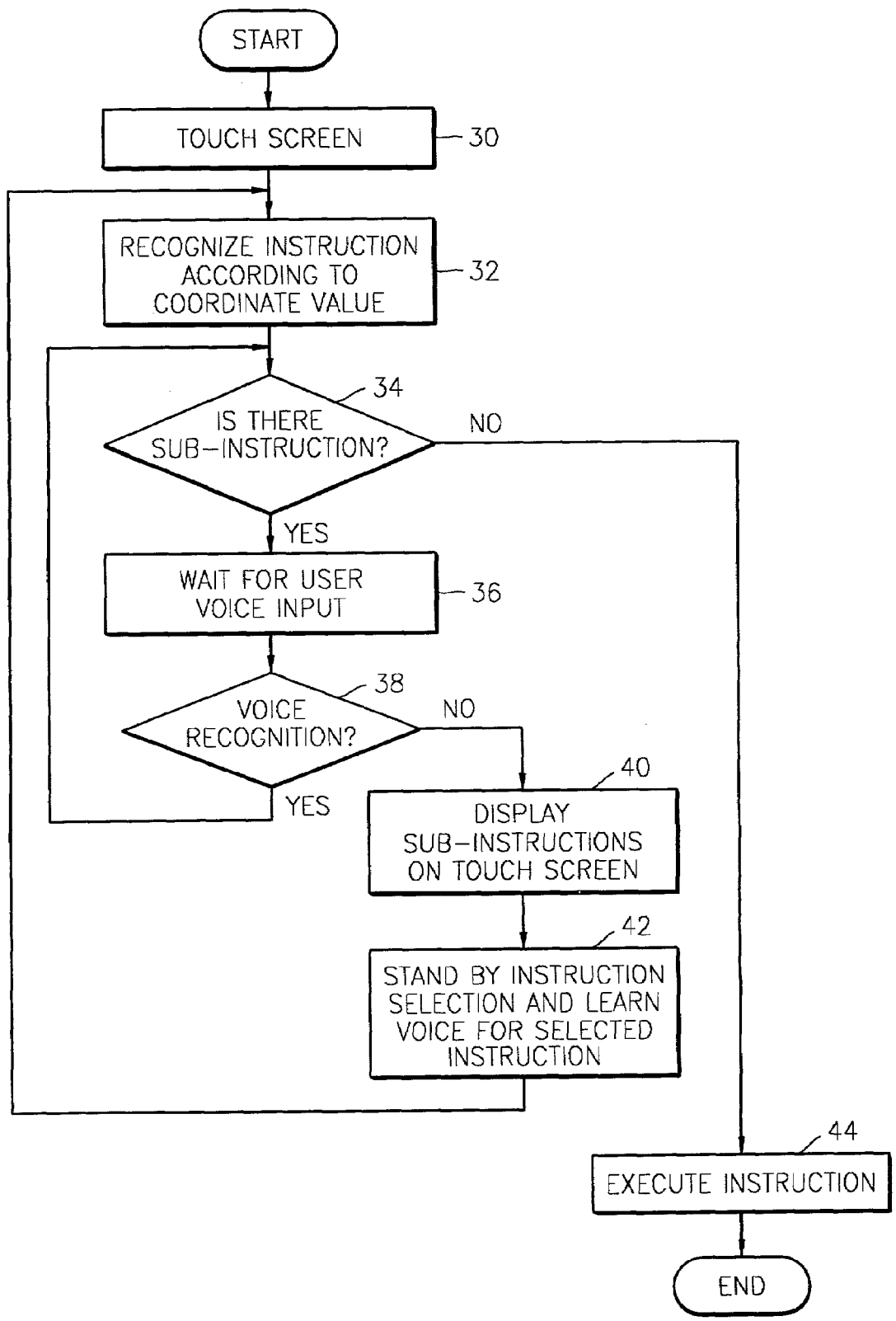
FIG. 4 is a flowchart of an instruction executing process performed by the information terminal of FIG. 2 according to another embodiment of the present invention.

FIG. 4 is a flowchart of an instruction executing method performed by the information terminal of FIG. 2. Referring to FIGS. 2 and 4, in step 30, a user selects a desired instruction by touching one of a plurality of items displayed on the touch screen 20. In this case, the touch screen 20 outputs a signal corresponding to the touched position to the system controller 26. The system controller 26 analyzes the signal generated in the touch screen 20 so that the system controller recognizes the coordinates of the signal. In step 32, the system controller 26 recognizes an instruction corresponding to the recognized coordinates as the desired instruction. Then, in step 34, the system controller 26 determines whether the recognized instruction has a plurality of sub-instructions. In step 44, if the recognized instruction does not have any sub-instructions, the recognized instruction is executed.

On the other hand, if the recognized instruction has a plurality of sub-instructions, the voice recognition and learning unit 22 waits for the voice inputs corresponding to the sub-instructions (step 36). If a voice signal is input, the voice recognition and learning unit 22 recognizes the input voice signal and provides the result of recognition to the system controller 26. The system controller 26 returns to step 34 if a voice corresponding to one of the sub-instructions is determined to be recognized by the voice recognition and learning unit 22 (step 38). In this case, when the user's voice is recognized, the recognized sub-instruction is displayed on the touch screen 20, thereby indicating that the instruction recognition is normally made.

Conversely, if a voice corresponding to one of the sub-instructions is not recognized by the voice recognition and learning unit 22, the system controller 26 displays sub-instructions which can be executed on the touch screen (step 40). If one of the sub-instructions displayed on the touch screen 20 is selected by the user, the system controller 26 returns to step 32 in order to execute the corresponding sub-instruction. At the same time, the system controller 22 controls the voice recognition and learning unit 22 so that the voice recognition and learning unit 22 learns that the voice signal, which has been input for executing a sub-instruction, is a voice instruction for the sub-instruction selected by the user (step 42). The voice signal input from the user is reproduced while the voice recognition and learning unit 22 learns the corresponding voice, thereby informing the user that the voice is currently being learned.

As described above, the information terminal according to the present invention performs the recognition and execution of an instruction by using a touch screen and a voice recognition, thereby making it easier to use the information terminal. In particular, even if the touch screen is so small that all information and instructions cannot be displayed together on the screen, the present invention allows the user to easily execute a desired instruction without displaying the instruction on the screen. Furthermore, if a currently input voice does not correspond to an instruction to be executed by the user, the present invention stores the fact that the currently input voice is a voice instruction for the instruction to be executed, thereby increasing the ease of use.

Preferred embodiments are provided in the drawings and specification. Specific terms used herein should not be construed as limiting the scope of this invention but fully convey the concept of the invention to those skilled in the art. Thus, it will be understood by those skilled in the art that various changes in form and details may be made therein without departing from the spirit and scope of the invention as defined by the appended claims.

What is claimed is:

1. An instruction executing method performed by an information terminal in which an instruction is executed by recognizing coordinates of a selected item or a voice of a user when one of a plurality of items displayed on a touch screen is selected, the method comprising the steps of:
   (a) recognizing the voice of a user input when one of the items is selected on the touch screen;
   (b) upon recognizing a voice corresponding to one of a plurality of sub-instructions corresponding to coordinates of the item selected in step (a), executing a corresponding sub-instruction; and
   (c) upon recognizing no voice corresponding to any one of the sub-instructions, displaying the plurality of sub-instructions on the touch screen.

2. The method as claimed in claim 1, further comprising the step of, if one of the sub-instructions displayed on the touch screen is selected, recognizing the selected sub-instruction and learning a voice for the selected sub-instruction.

3. An instruction executing method performed by an information terminal in which an instruction is executed by recognizing the coordinates of a selected item or a voice of a user when one of a plurality of items displayed on a touch screen is selected, the method comprising the steps of:
   (a) recognizing an instruction corresponding to the coordinates of a selected item when one of items is selected on the touch screen;
   (b) executing the recognized instruction if the recognized instruction is not determined to have any sub-instruction associated therewith;
   (c) waiting for the input of a user's voice if the recognized instruction is determined to have two or more sub-instructions;
   (d) upon receiving the user's voice, recognizing the user's voice and thus a sub-instruction corresponding to the recognized voice and returning to step (b);
   (e) upon not recognizing a voice corresponding to any one of the sub-instructions in step (d), displaying the sub-instructions on the touch screen; and
   (f) upon selecting one of the sub-instructions on the touch screen, recognizing the selected sub-instruction through coordinates thereof and returning to step (b) and learning a voice for the selected sub-instruction.

4. The method as claimed in claim 1, wherein if the user's voice is recognized, a recognized sub-instruction is displayed on the touch screen, thereby indicating that the sub-instruction is normally recognized.

5. The method as claimed in claim 3, wherein if the user's voice is recognized, a recognized sub-instruction is displayed on the touch screen, thereby indicating that the sub-instruction is normally recognized.

6. The method as claimed in claim 2, wherein while the voice for the selected sub-instruction is learned, the voice input by the user is reproduced, thereby indicating that the voice has been learned.

7. The method as claimed in claim 3, wherein while the voice for the selected sub-instruction is learned, the voice input by the user is reproduced, thereby indicating that the voice has been learned.

8. A recording medium on which the method claimed in claim 1 is recorded in a program code that can be executed on a computer.

9. A recording medium on which the method claimed in claim 2 is recorded in a program code that can be executed on a computer.

10. A recording medium on which the method claimed in claim 3 is recorded in a program code that can be executed on a computer.

11. A recording medium on which the method claimed in claim 4 is recorded in a program code that can be executed on a computer.

12. A recording medium on which the method claimed in claim 5 is recorded in a program code that can be executed on a computer.

13. A recording medium on which the method claimed in claim 6 is recorded in a program code that can be executed on a computer.

14. A recording medium on which the method claimed in claim 7 is recorded in a program code that can be executed on a computer.

15. An information terminal having a touch screen on which an instruction is input by touching the screen and the result of executing the instruction is displayed, the information terminal comprising:
   a voice recognition and learning unit for recognizing a voice signal input from outside the information terminal; and
   a system controller which when a predetermined item on the touch screen is touched, recognizes an instruction corresponding to coordinates of the touched item, and which when a voice corresponding to one of a plurality of sub-instructions associated with the recognized instruction is recognized by the voice recognition and learning unit, executes the corresponding sub-instruction; wherein;
   the system controller displays the plurality of sub-instructions on the touch screen if a voice corresponding to the sub-instruction of the recognized instruction is not recognized.

16. The information terminal as claimed in claim 15, wherein the system controller controls the voice recognition and learning unit so that the voice recognition and learning unit learns that a sub-instruction corresponding to the input voice signal is the selected sub-instruction if one of the plurality sub-instructions is selected.

17. The information terminal as claimed in claim 15, wherein the voice recognition and learning unit reproduces the input voice signal while learning the voice corresponding to the selected sub-instruction.

18. The information terminal as claimed in claim 16, wherein the voice recognition and learning unit reproduces the input voice signal while learning the voice corresponding to the selected sub-instruction.

* * * * *